US007826207B2

(12) United States Patent
Wang

(10) Patent No.: US 7,826,207 B2
(45) Date of Patent: Nov. 2, 2010

(54) DISPLAY APPARATUS WITH PROTECTIVE FILM

(75) Inventor: Cho-Hao Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 62 days.

(21) Appl. No.: 12/346,888

(22) Filed: Dec. 31, 2008

(65) Prior Publication Data

US 2010/0027208 A1 Feb. 4, 2010

(30) Foreign Application Priority Data

Jul. 30, 2008 (CN) .................. 2008 2 0301648

(51) Int. Cl.
*H05K 7/16* (2006.01)
(52) U.S. Cl. .................. 361/679.22; 361/679.24; 361/679.21; 248/917; 349/58

(58) Field of Classification Search ............ 361/679.21, 361/679.22, 679.24; 248/917–924; 349/58
See application file for complete search history.

(56) References Cited

U.S. PATENT DOCUMENTS

| 5,754,259 | A * | 5/1998 | Nakamatsu et al. | 348/835 |
| 6,765,550 | B2 * | 7/2004 | Janick et al. | 345/87 |
| 6,826,859 | B1 * | 12/2004 | Lin | 40/514 |
| 7,301,760 | B2 * | 11/2007 | Chen | 361/679.27 |
| 2010/0053854 | A1 * | 3/2010 | Nishikawa et al. | 361/679.01 |

\* cited by examiner

*Primary Examiner*—Jayprakash N Gandhi
*Assistant Examiner*—Ingrid Wright
(74) *Attorney, Agent, or Firm*—Zhigang Ma

(57) ABSTRACT

A display apparatus comprises a housing having a receiving module on one side and a display surface. A protective module is received in the receiving module. The other side of the housing has an attached fixing unit. The protective module can unfurl and cover the display, providing protection.

4 Claims, 5 Drawing Sheets

DISPLAY APPARATUS WITH PROTECTIVE FILM

BACKGROUND

1. Field of the Invention

The disclosure relates to display apparatuses and, particularly, to a display apparatus utilizing a protective film.

2. Description of Related Art

Optical displays of devices such as personal digital assistants (PDAs), cell phones, and especially touch panel displays, typically have an exposed viewing surface made from a thermoplastic slab. These devices are subject to frequent handling and contact with the user and other objects. The thermoplastic slabs have good optical transparency, but unfortunately have poor abrasion resistance.

Display surfaces of computers are handled less frequently but nonetheless are sometimes touched, scratched or smudged. Consequently, the viewing face of the screen is susceptible to scratches, abrasion and smudges arising during routine use. To protect such screens and displays, protective films or coatings can be employed.

Protective films for PDAs, cell phones, computer screens, and other display devices are precut sheets of plain plastic film, the sheets having on one side thereof an adhesive layer and having on the other side thereof a smooth and glossy layer. The adhesive layer of the sheet contacts the viewing face of the display and the smooth and glossy layer as protectors to resist abrasion. However, the precut sheet of plain plastic is not easy to effectively adhere to the display surface and easily experience formation of air bubbles therebetween. Furthermore, when removing the precut sheet, adhesive material often remains on the face, and is difficult to remove.

What is needed, therefore, is a display apparatus providing effective display surface protection capable of easy removal.

BRIEF DESCRIPTION OF THE DRAWINGS

Many aspects of the present display apparatus utilizing a protective film can be better understood with reference to the following drawings. The components in the drawings are not necessarily drawn to scale, the emphasis instead being placed upon clearly illustrating the principles of the present display apparatus utilizing a protective film.

Figure 1:
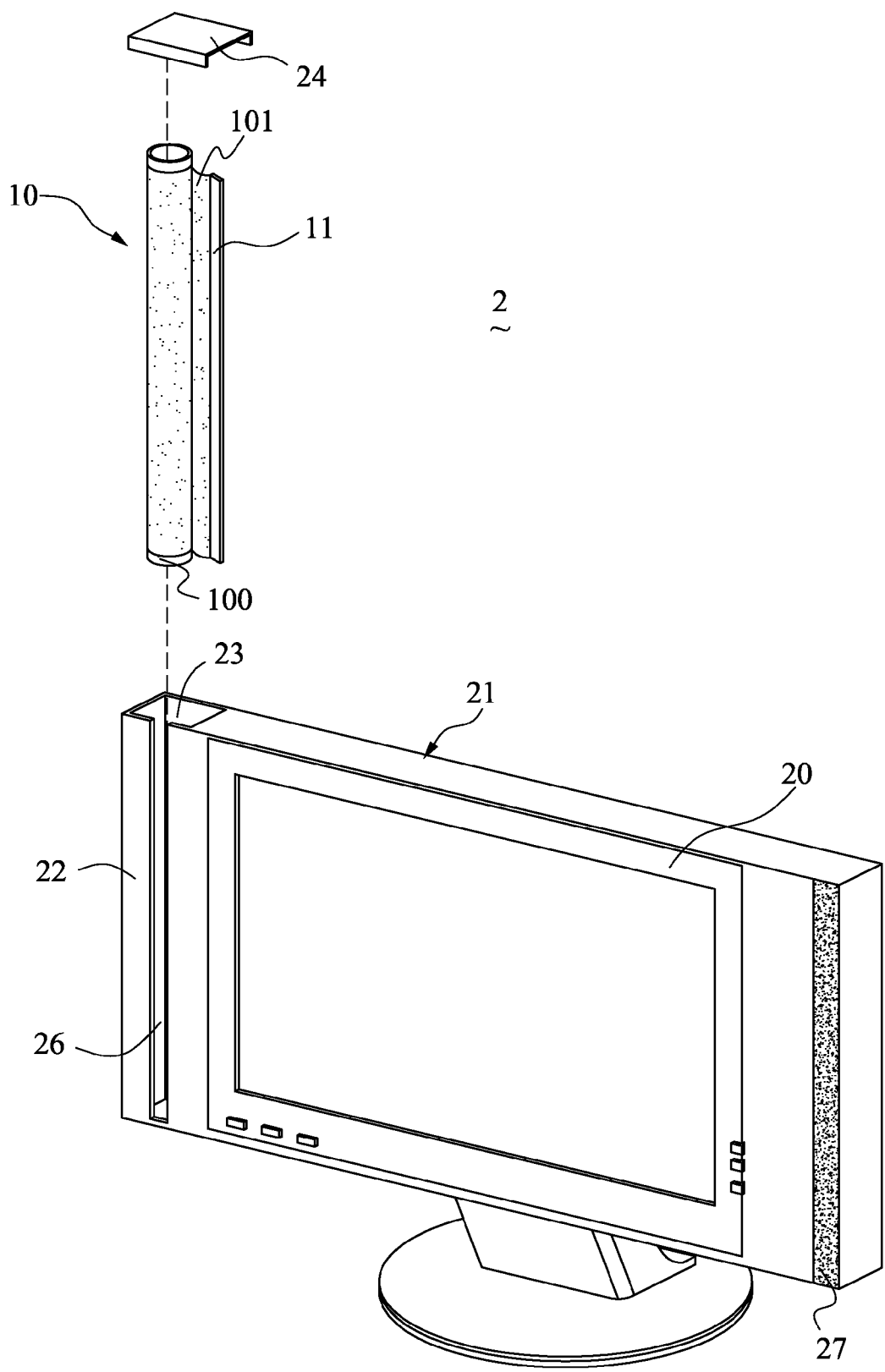
FIG. 1 is an exploded view of a display apparatus in accordance with a first embodiment of the present disclosure.

Corresponding reference characters indicate corresponding parts throughout the several views. The exemplifications set out herein illustrate at least one embodiment of the present display apparatus utilizing a protective film, in one form, and such exemplifications are not to be construed as limiting the scope of the invention in any manner.

DETAILED DESCRIPTION

Figure 2:
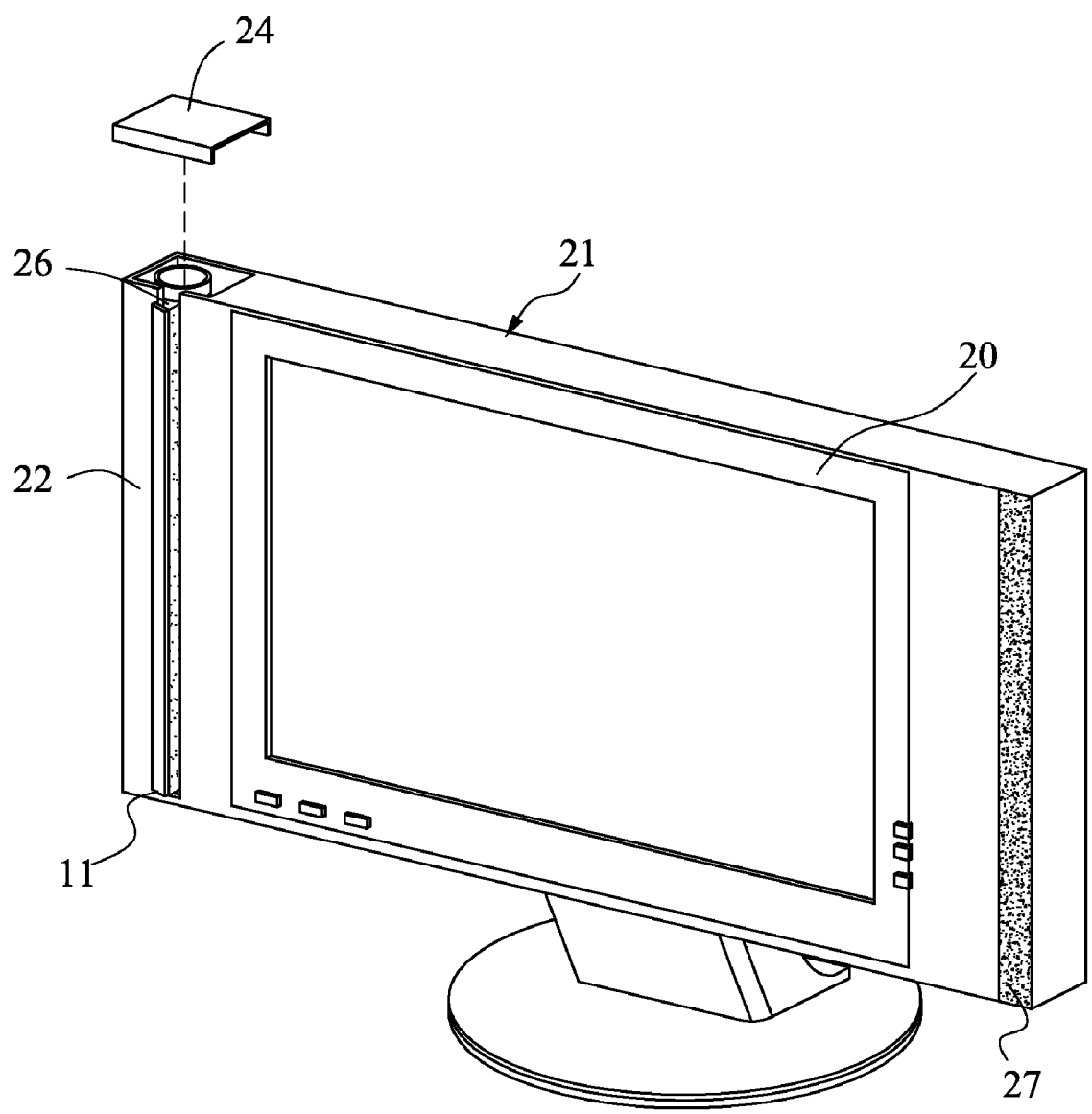
FIG. 2 is a partially assembled perspective view of the display apparatus in FIG. 1, showing a protective film is in a first position
Figure 3:
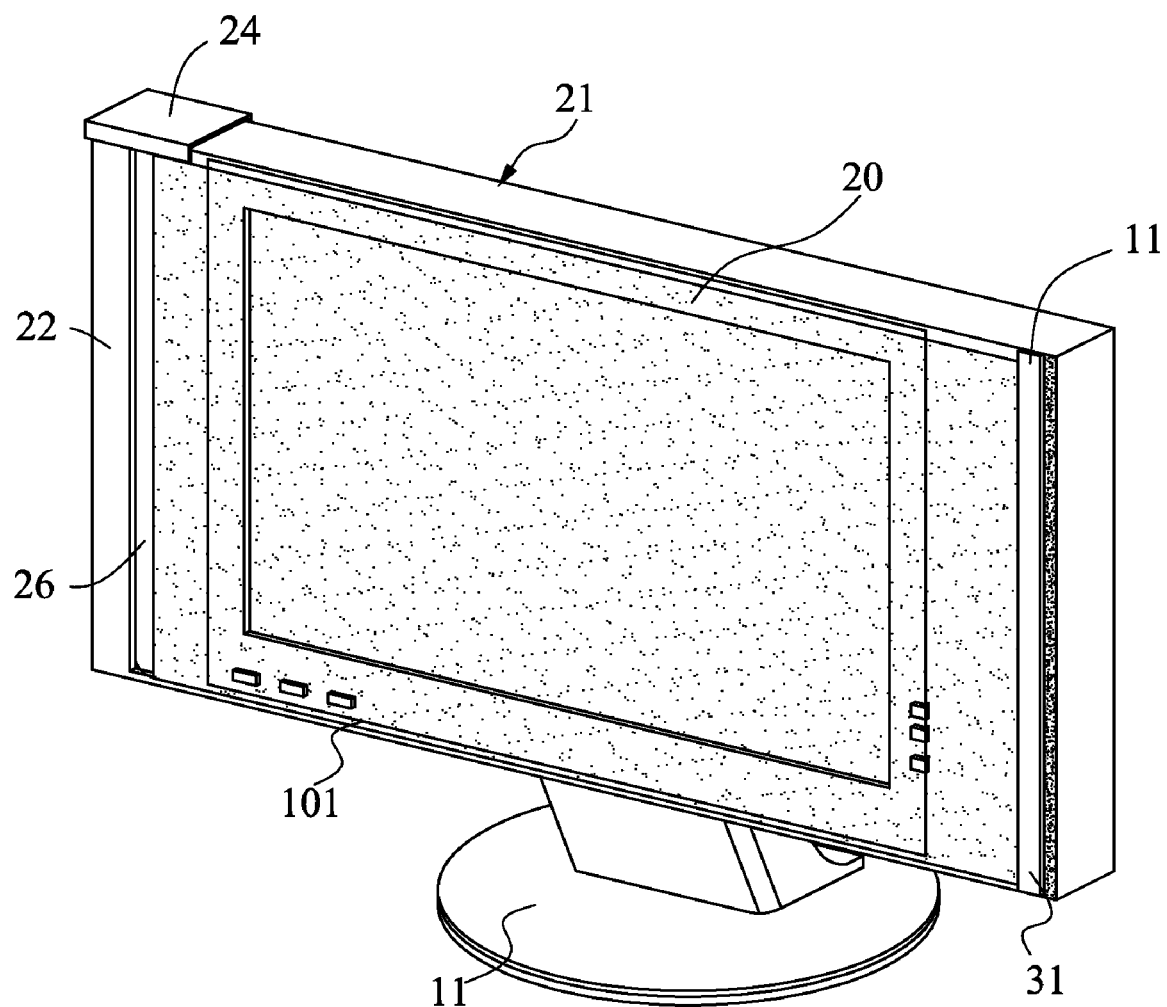
FIG. 3 is another perspective view of the display apparatus of FIG. 1, showing that the display is covered by a protective film in a second position.

FIGS. 1-3 show a first embodiment of the present disclosure of a display apparatus 2 comprising a display surface 20, a housing 21 closely fitted on the display 20, and a protective module 10 received in one side of the housing 21.

The housing 21 comprises a receiving module 22 in one side thereof. The receiving module 22 defines a sleeve 23 and a groove 26 on the perimeter of the sleeve 23. The sleeve 23 is closed off at base end and open at top end of receiving module 22. The groove 26 extends along the longitudinal axis and beside the viewing face of the display surface 20. The groove 26 and the sleeve 23 communicate with each other. The cover 24 closely fits the top end. The other side of the housing 21 has a fixing unit 27 attached thereon.

The protective module 10 includes an axle 100, a protective film 101, and a fixing strip 11. One side of the protective film 101 is fixed on the axle 100, the other side having a fixing strip 11. The protective film 101 is capable of rolling onto a cylinder around the axle 100

The protective module 10 is received in the sleeve 23, and the strip 11 can pass through the groove 26. The protective film 101 can unfurl between a first position and a second position. In FIG. 2, the protective film 101 is in the first position, and display surface 20 is exposed. In FIG. 3, the protective film 101 is in the second position, covering the display surface 20, providing protection thereof from scraping. The strip 11 is fixed on the fixing unit 31 when the protective film 101 covers the display surface 20 completely. The strip 11 can be metal, magnetic material, or a hook. In the present embodiment, the strip 11 is metal, the protective film 101 is Polyethylene Terephthalate, and the fixing unit 27 is magnetic material.

The cross-sectional size of the sleeve 23 is substantially larger than the outer diameter of the protective module 10, allowing the protective module 10 to rotate around axle 100 therewithin.

Figure 4:
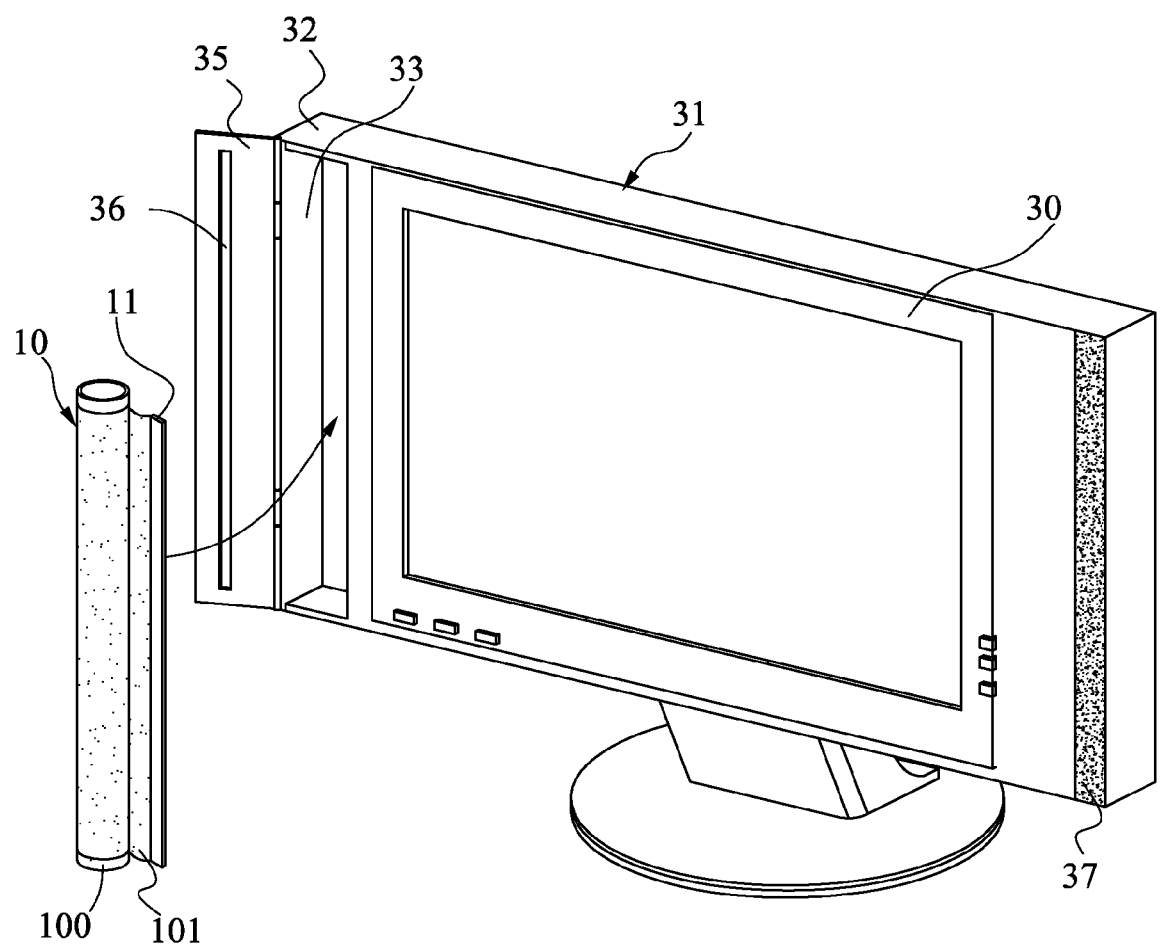
FIG. 4 is an exploded view of a display apparatus in accordance with a second embodiment of the present disclosure.

Referring to FIG. 4, a display apparatus 3 in accordance with a second embodiment of the present disclosure is shown. The display apparatus 3 is similar to the display apparatus 2, differing only in that housing 31 comprises a receiving module 32 having a space 33 in one side thereof that is open at the front end and closed off at the rear end, and sleeve 23 is open at the top end and closed off at the base end. The space 33 receives the protective module 10. The receiving module 32 has a cover 35 rotatably connected to one side thereof, set up with the viewing face of the display surface 20 on the same side. The cover 35 has a groove 36 thereon extending along the longitudinal axis. When the door is closely fitted onto the space 33, the groove 36 and the space 33 are connected. The other side of the housing 21 has a fixing unit 37 attached thereon.

The protective module 10 is received in the space 33. When the cover 35 closely fits the space 33, the strip 11 can pass through the groove 36. When the protective film 101 fully covers the viewing face of display surface 30, the strip 11 is fixed on the fixing unit 37. The space 33 is substantially larger than the protective module 10, such that protective module 10 can rotate around the axle 100 therewithin.

Figure 5:
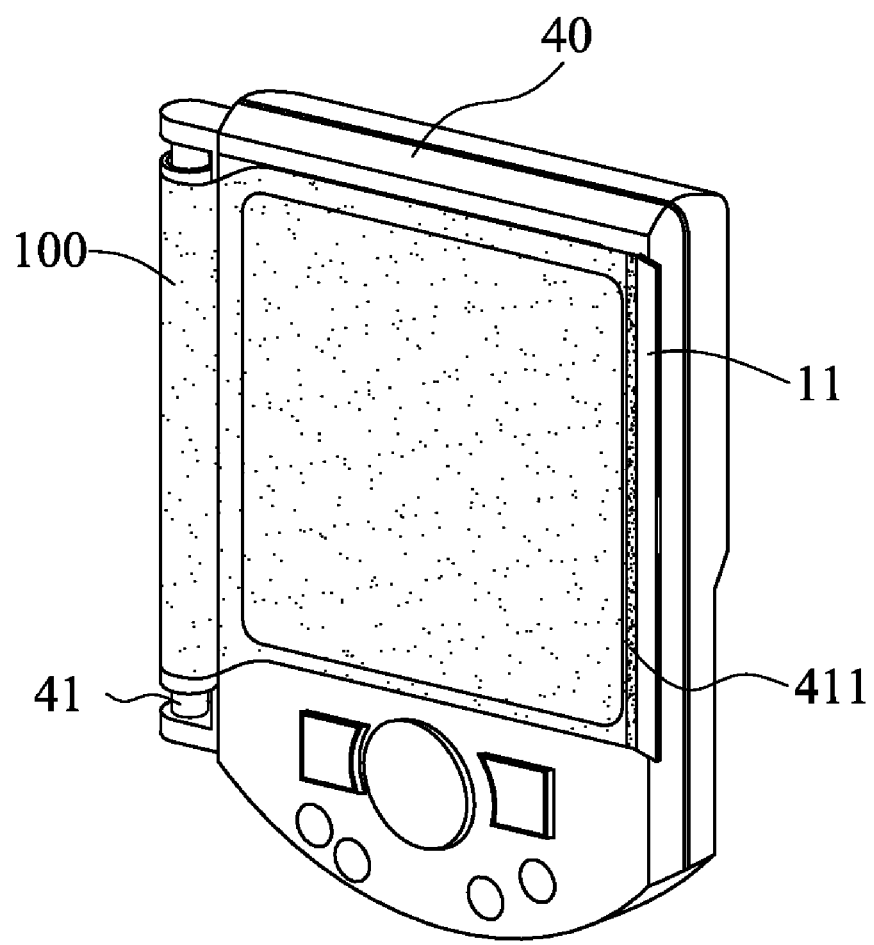
FIG. 5 is a perspective view of a portable device in accordance with a third embodiment of the present disclosure.

Referring to FIG. 5, a portable device 4 in accordance with a third embodiment of the present disclosure is shown, differing from the previous embodiment in the presence of a pair of pivots 41 attached on one side thereof. The axle 100 is hollow on two ends, and engages the two pivots 41 for rotatable connection of the protective module 10. A fixing unit 411 is attached on the opposite side of the portable device 4. When the protective film 101 fully covers the viewing face of display surface 40, the strip 11 is fixed on the fixing unit 411.

While the present disclosure has been described by way of example and in terms of preferred embodiment, it is to be understood that the invention is not limited thereto. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display apparatus comprising a display surface, the apparatus comprising:
    a housing comprising a receiving module on one side and a fixing unit attached on the other side of the surface, the receiving module comprising a space, a cover pivotably attached to a side of the receiving module to cover the space, the cover defining a groove communicating with the space; and
    a protective module received in the space of the receiving module, the protective module comprising:
    an axle; and
    a protective film, and comprising one side which is fixed on the axle and the other side having a fixing strip attached thereon;
    wherein when the protective film rolls on the axle and is received in the space, the cover is operable to cover the space, the fixing strip passes through the groove and moves away from the axle to engage with the fixing unit, and the film is unfurled to cover the display surface.

2. The display apparatus as claimed in claim 1, wherein the space is closed off at a rear end and open at a front end, and the cover pivotably covers the open front end of the space, and the groove extends along an axial orientation of the cover.

3. The display apparatus as claimed in claim 1, wherein the strip and the fixing unit are made of ferromagnetic material.

4. The display apparatus as claimed in claim 1, wherein the protective film is Polyethylene Terephthalate.

* * * * *